United States Patent Office 3,098,047
Patented July 16, 1963

3,098,047
FLAME RETARDANT CELLULAR PRODUCT
John C. Tapas and Israel J. Dissen, Chicago, Ill., assignors to Velsicol Chemical Corporation, Chicago, Ill., a corporation of Illinois
No Drawing. Filed Sept. 20, 1955, Ser. No. 535,510
6 Claims. (Cl. 260—2.5)

This invention relates to new fire and heat resistant cellular plastic compositions. More specifically, the present invention relates to fire and heat resistant diisocyanate foaming and foam-in-place resins containing as a constituent element a chlorendic acid based alkyd resin.

The foaming or foam-in-place resins are particularly useful and have been used for filling voids and cavities of intricate shapes where cutting and shaping lightweight cellular materials is not practical and does not provide a contiguous bond with the internal surface of said cavity. Such voids are filled with a lightweight cellular material for a variety of reasons, some of which are to lend structural support to thin metal housing, to provide insulation from heat and electricity, and in some instances to maintain objects in fixed spatial relationship to each other. The procedure ordinarily followed in the use of such resins is to introduce the unfoamed resin composition into the cavity and by the application of moderate heat, promote the foaming action of said resin, thus filling the cavity and producing a rigid cellular plastic foam closely bonded to the walls of the cavity. By utilizing this unique property, foam-in-place resins have been used where internal structural support is necessary but a minimum of weight is an important factor. These resins have been used in the aircraft industry in the production of radar domes, thin aircraft members such as wingtips, and aircraft partition structures using sandwich construction to provide strength and insulation. In addition to utility in the aircraft industry, foams may also be used as insulation for intricately shaped industrial equipment which is not readily adapted to lay-on insulation. Other uses are in industries such as electronics where the non-conducting character of resins in general is valuable and where reduced weight and ready conformability is especially useful. General application in industry for insulation and support of voids has also been seen.

While conventional foam-in-place resins have been used as above described, they are not entirely satisfactory from several viewpoints. In particular, they are not satisfactory in respect to fire and heat resistance and such properties are desirable and necessary in the production of equipment used in military aircraft, naval craft, or on civilian aircraft where fire is a constant hazard.

The compositions of the present invention are especially useful in that they have all the desirable properties of conventional foaming resins, and in addition they are heat and fire resistant.

The compositions of the present invention are also valuable in that the novel fireproof foams can be prepared having optimum physical properties using about 50% of the diisocyanate required for conventional foams, thereby effecting a substantial savings on the cost of this most expensive ingredient.

The conventional foam-in-place resin is prepared by reaction of a diisocyanate with a liquid alkyd resin. The alkyd resin utilized is usually of relatively high acid value and is formulated so as to contain an excess of hydroxy groups over the theoretical stoichiometric number of carboxylic acid groups. In the conventional alkyd used for foam-in-place resins, two dicarboxylic acids and a trihydroxy alcohol are used. The acids are usually phthalic and an aliphatic dicarboxylic acid, such as, adipic, succinic, sebacic or glutaric acids. The trihydroxy alcohols which have been used are glycerol, hexanetriol, trihydroxymethyl propane, and other longer chain triols. The trihydroxy alcohol is necessary to provide functional groups other than at the end of an alkyd chain, whereby the diisocyanate can react with the unutilized hydroxyl groups and form a cross-linked polymer which is rigid and relatively unaffected by thermal changes. The formulations may vary, but generally from 50 to 100% excess of hydroxy groups is desirable, the criterion being the flexibility of the alkyd. Thus, in more fluid and flexible alkyds, greater numbers of unreacted hydroxyl groups are necessary to produce the requisite cross-linking to make the finished foam rigid. In the more rigid alkyds, fewer hydroxyl groups are necessary to produce a rigid and hard-foamed product.

The conventional alkyd resin used for foaming purposes ordinarily has an acid number of about 25 to 60 to provide the requisite carboxyl groups to produce the carbon dioxide gas to form the foam cells.

While fire resistant foams have heretofore been prepared, it is usually by the preparation of an unsaturated alkyd and utilization of a fire-resistant cross-linking agent which is simultaneously polymerized during the foaming operation. Other fire resistant foams have been prepared by the use of chlorinated additives and antimony oxide. All of these foams are complex, difficult to prepare, and cannot be readily handled or controlled in industrial operations, and all these foams require additional ingredients and all require additional steps in their preparation. In addition, it may be generally stated that the cost of such complex foams is quite high over conventional foams and more costly than the products of the present invention.

The compositions of the present invention are fire resistant foams by virtue of inherent fire resistance in the alkyd resin and require no unsaturation in the alkyd resin or additives of any kind, and are not conjointly polymerized with fire-resistant cross-linking agents. Thus, the fire resistant compositions of the present invention are prepared without any additional process or component requirements.

The composition of the present invention is also valuable in that an unexpected but substantial reduction in the amount of diisocyanate is necessary to produce the fire resistant foams having optimum physical properties is realized as compared with the amount used in conventional foam-in-place resins heretofore known. For example, when using conventional, flammable alkyd resins of acid number of about 40, it is recommended that about 23–24 grams of toluene diisocyanate be used with 25 grams of alkyd to produce a foam having optimum properties with respect to cure, degree of brittleness, hardness, strength and heat resistance. In the case of the foam-in-place resins of the present invention, containing a chlorendic acid based alkyd of comparable acid number, only about 12 grams of toluene diisocyanate need be used to secure these same optimum properties and in addition fireproofing is attained. While in each case the amount of diisocyanate used may vary, the range is quite small and a few grams either way are all that it can be extended before noticeable falling off of physical properties occurs.

In the case of conventional flammable alkyds, the range of, for example, toluene diisocyanate based on 25 grams of alkyd resin is from about 18 grams to about 24 grams. Other diisocyanates would be used in the same molar ratio. In selecting a diisocyanate and in determining its proportion and suitability, consideration is given to the physical properties of the alkyd as to hardness, flexibility, hydroxyl content, and also to the character of the diisocyanate with regard to its molecular weight, its degree of aromaticity, etc. In the present novel foam compositions the range of diisocyanate, again referring specifically to toluene diisocyanate, to the resin is from about 6 to about 15 grams for every 25 grams of alkyd.

This is equivalent to from about 19 to about 38 weight percent disocyanate, based on chlorendic alkyd as compared with from about 42 to about 49 weight percent diisocyanate based on conventional flammable alkyd formulations. The amount of a given diisocyanate necessary to prepare the present fireproof foams from chlorendic alkyds will invariably be less than that required when corresponding conventional alkyds are used.

The present invention covers a flame retardant, rigid, cellular plastic foam comprising from 19 to 38 weight percent of an aromatic diisocyanate reacted with 62 to 81 weight percent of a liquid alkyd resin containing chlorendic acid as a constituent element, said foam containing not less than about 12 weight percent chlorine.

Exemplifying aromatic diisocyanates are diphenyl methane diisocyanate and toluene diisocyanate.

The aromatic diisocyanate is preferably toluene diisocyanate because of its lower molecular weight. The toluene diisocyanate used can be any or a mixture of the isomers represented by that name, but the meta toluene diisocyanate is preferred. Commercial toluene diisocyanate may be a mixture of toluene diisocyanates and such mixtures can be used. Generally, such mixtures are preponderantly meta toluene diisocyanate. Similarly, diphenyl methane diisocyanate used may be any isomer such as the p-p' isomer or mixtures of isomers.

The chlorendic acid based alkyd resins useful in the production of the foams of the present invention are formulated from chlorendic acid or anhydride, a dibasic carboxylic acid other than chlorendic, and an excess of trihydroxy alcohol. The total number of hydroxy groups available for esterification is in excess of the stoichiometric amount required for reaction with the dibasic acids present to the extent of about 75 to 100 percent. Triols are used in preparing these alkyds to assure the presence of unreacted hydroxyl groups in the alkyd chain. These hydroxyl groups react with the diisocyanate to form urethanes and also cross-link the linear polymer to provide a rigid polymer which retains the gaseous carbon dioxide in minute cells which results in the characteristic cellular structure. When finally cured, the foam is quite rigid and self-supporting at ordinary room temperatures and elevated temperatures.

The alkyd so prepared should be a liquid at room temperature or readily flowable with moderate warming without premature carbon dioxide formation so as to facilitate and permit intimate mixing with the diisocyanate which in most cases is not a particularly good solvent for alkyds. The chlorendic alkyds described in the present invention are also necessarily fluid at the temperature used, but such an alkyd cannot be prepared from triols such as glycerol as are the alkyds used in conventional foams, since chlorendic alkyds containing sufficient chlorendic acid to produce fire resistant foams are solids or semi-solids at room temperature. Thus, in preparing alkyds of chlorendic acid suitable for use in foaming resins, it is necessary to use a long chain triol to produce the desirable fluidity in the alkyd initially and ultimately reduce the tendency toward brittleness in the finished foam.

Triols which are useful in the preparation of fluid chlorendic alkyds are those containing from 5 to 10 carbon atoms, inclusive. Exemplary of triols which can be used are 1,2,6-hexanetriol and ether alcohols such as the ether of ethylene glycol and 2,4-dimethyl-2-hydroxymethyl-1,5-pentanediol having the formula

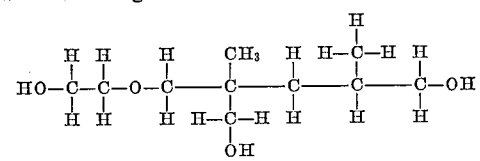

both of which triols are commercial available.

The dibasic acids useful in the preparation of fluid chlorendic alkyds are those aliphatic acids containing from 5 to 10 carbon atoms, inclusive. The preferred acid is adipic acid. Exemplary of others which can be used are sebacic acid or azelaic acid.

Chlorendic acid which has the structure

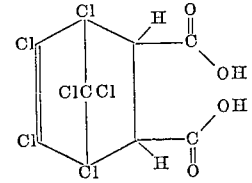

and which can be used in the preparation of fluid chlorendic based alkyds is obtainable commercially. It is the hydrolyzed Diels-Alder adduct of hexachlorocyclopentadiene and maleic anhydride. Actually, either chlorendic acid or chlorendic anhydride can be used in preparing the chlorendic alkyds herein discussed.

The chlorendic acid or anhydride, the triol, and the dibasic aliphatic acid, all of which are used in the preparation of fluid chlorendic based alkyds, are used in amounts indicated by the ranges of mole percentages in the following table:

|   | Mole Percent |
| --- | --- |
| Chlorendic acid (anhydride) | 14–22 |
| Dibasic aliphatic acid | 20–29 |
| Triol | 55–60 |

If the above shown components are used within the ranges indicated, a suitably fluid chlorendic based alkyd is produced, which when treated with diisocyanate will produce a foam-in-place resin with the unique desirable properties hereinbefore ascribed to it.

The following examples will illustrate the preparation of suitable alkyd resins:

EXAMPLE I

*Alkyd Resin Containing Chlorendic Acid, Adipic Acid, and Hexanetriol in Molar Ratios of 1:2:4, Respectively*

Into a 300 ml., 3-necked flask equipped with a stirrer, thermometer, and sintered glass sparge tube were charged 89.1 g. of 1,2,6-hexanetriol, 62.1 grams of chlorendic anhydride, and 48.9 g. of adipic acid. The contents of the flask were heated with stirring to a temperature of 345° F. over a 1¼-hour period. Nitrogen gas was bubbled through the melt during the entire reaction. The reaction mixture was maintained at 335–345° F. for an additional 1¼ hours, at which time the acid number was below 35. The alkyd resin thus produced was a viscous tan-colored liquid which became quite fluid on moderate warming.

EXAMPLE II

*Alkyd Resin Containing Chlorendic Acid, Adipic Acid, and Triol 230 in Molar Ratios of 1:2:4, Respectively*

Into a 300 ml., 3-necked flask equipped with a stirrer, thermometer, and sintered glass sparge tube were charged 110 g. of triol 230 (the ether of ethylene glycol and 2,4-dimethyl, 2-hydroxymethyl 1,5-pentanediol), 50 g. of chlorendic anhydride, and 39 g. of adipic acid. The contents of the flask were slowly heated to about 340° F. over a 1¼-hour period with stirring and bubbling of nitrogen gas through the reaction mixture. The reaction mixture was heated at 340° F. for an additional ¾ hour at which time the acid value was 43. The resultant alkyd was a brown liquid which was rather viscous at room temperature, but free-flowing when moderately warmed.

EXAMPLE III

*Alkyd Resin Containing Chlorendic Acid, Adipic Acid, and Hexanetriol 1,2,6 in Molar Ratios of 1½:1½:4, Respectively*

Into an apparatus similar to that used in Examples I and II were charged 81.5 g. of 1,2,6-hexanetriol, 85 g. of chlorendic anhydride, and 33.5 g. of adipic acid. The reactants were heated with stirring and nitrogen sparge to a temperature of 345° F. over a 1¼-hour period. The temperature was maintained for an additional 1½ hours at 335–345° F. at the end of which time the acid value was below 35. The product was a fluid alkyd of brown color.

The alkyd resins as prepared in the foregoing examples are useful in the preparation of foam-in-place resins. The formulation of such resins is straightforward and involves the use of organic diisocyanates. The ratio of alkyd to diisocyanate may vary, and as previously described, the amount of diisocyanate necessary is correspondingly less than that required by conventional flammable alkyds to produce a foam of optimum properties.

The characteristic nature of the foam is alterable with respect to density by various means. Generally, the foam produced by simple admixture of alkyd and diisocyanate is of a high density and has smaller cells than ordinary. One method of producing foams having a lesser density is to increase the ratio of diisocyanate to alkyd within the permissible range. Another method which has a more striking effect is to incorporate foam modifying agents into the resin. Such useful agents are wetting agents such as dioctyl ester of sodium sulfosuccinate which is sold under the trade name of Aerosol OT, or metallic salts of fatty acids, such as, zinc stearate, aluminum stearate, calcium stearate, magnesium stearate, zinc laurate, calcium oleate, and barium stearate. Foams containing such modifying agents are generally less dense and more uniform than those without such agent. Tht amount necessary is not critical, but small amounts are preferred to prevent alteration of the physical properties of the foam. Generally, from about 2½ to 7 weight percent based on alkyd resin present produces excellent results. The foam regulation agent may be directly incorporated into the resin in all cases and such procedure is preferred in the use of metallic soaps. For better dispersion, a solvent is recommended in the case of Aerosol OT. Such solvent is preferably an inert solvent, such as, carbon tetrachloride or other chlorinated solvent. Solvents such as acetone which are recommended for incorporation of Aerosol OT in conventional foams are not recommended in the present formulations, since acetone is flammable and reduces the flame resistance of the present compositions, and acetone also reacts with the diisocyanate through the ketone group.

The preferred foam regulation agent for use in the present invention is dioctyl sulfosuccinate which is incorporated into the resin in an inert solvent solution. The above wetting agent is used as a 10% solution in carbon tetrachloride. Such solution is added to the alkyd resin in an amount of from 2 to 4 ml. per 25 grams resin. In some instances, the use of water is recommended to produce a low density foam, the water being introduced as such or as residual water in the alkyd being utilized, but generally the use of water produces a rather coarse foam which is not desirable. Pressure on the cavity wherein the foam is contained may also be used to regulate the cell size to some extent.

The formulation and handling procedures for the present foam-in-place compositions are equivalent to that used in conventional foams. The molds are generally preheated to the initial curing temperature of about 150 to 160° F. The ingredients of the foam are placed in a beaker or vessel and covered with a polyethylene tent to exclude moisture and reduce diisocyanate fumes. The alkyd and diisocyanate are placed in a vessel and stirred while keeping the temperature below 30° C. After about 8 to 10 minutes the reactants are smooth, creamy, and homogeneous. The foam regulation agent may be added at this time or at the beginning of the mixing procedure. The mass is then transferred to the mold which is heated at about 150° F. for about one hour for initial foaming, and further heated at about 240° F. for two or more hours for greater cure. The following examples will illustrate several formulations for foams and methods of curing:

EXAMPLE IV

To 24 grams of an alkyd having respective molar ratios of 1:2:4 of chlorendic acid, adipic acid, and 1,2,6-hexanetriol (prepared in Example I) was added 13 grams of toluene diisocyanate. The reactants were stirred for about 8 to 10 minutes while maintaining the temperature below about 30° C. with cooling. Air and moisture were excluded from the reactants by means of a polyethylene tent. At the end of this time the reactants were a smooth creamy paste which was poured into a container heated at 65° C. and placed in an oven maintained at 65° C. After ½ hour the foam formed was hard, but not brittle. A thin section sawed easily and was found to be fire retardant, a section being self-extinguishing after removal from a Bunsen flame. The chlorine content of the foam was about 12.2%.

EXAMPLE V

To 30 grams of the alkyd resin prepared in Example II was added 10 grams of m-toluene diisocyanate. The reactants were stirred for about ten minutes, taking precautions to exclude atmospheric moisture, and cooling was carried out to maintain the reactants below 30° C. When a homogeneous material was obtained, the mixture was poured into a paper container and placed in an oven at 65° C. for ½ hour. The temperature was raised to 100° C. for an additional one hour. The resultant foam was hard at room temperature and relatively hard at 100° C.

EXAMPLE VI

To 25 grams of an alkyd resin prepared as in Example III but with acid number of 46 was added 15 grams of toluene diisocyanate. The reactants were stirred for about 10 minutes with cooling and when a homogeneous cream, poured in a paper cup and cured for ½ hour at 65° C. The resultant foam was somewhat brittle, but structurally strong and fire retardant and self-extinguishing.

EXAMPLE VII

To 25 grams of an alkyd resin prepared as in Example III with acid number of 46 was added 10 grams of toluene diisocyanate. The reactants were stirred with cooling until homogeneous (ca. 8 min.), and 2 ml. of a 10% solution of Aerosol OT in carbon tetrachloride was added with about one minute additional stirring to again form a homogeneous solution. The mixture was poured into a mold at 65° C. and cured for ½ hour, at the end of which time the foam was fairly hard. The product was fire resistant and self-extinguishing.

EXAMPLE VIII

Several formulations were prepared from an alkyd resin of the type described in Example III cooked at 340–350° F. for about 2½ hours and having an acid value of 42. The amount of diisocyanate used was 12 grams per 25 grams of alkyd. To each of two similar formulations was added respectively 2 ml. and 3½ ml. of 10% Aerosol OT in carbon tetrachloride solution, using the procedure outlined in Example VII. The resultant foams after curing for ½ hour at 65° C. and 2 hours at 100° C. were hard at that temperature and self-extinguishing when removed from a Bunsen flame.

EXAMPLE IX

An alkyd resin identical with that used in Example VIII was formulated with varying amounts of toluene diisocyanate. To 25 gram portions of alkyd were added respectively 6 grams, 12 grams, and 15 grams of toluene diisocyanate. No wetting agent was added to the formulations which were mixed until homogeneous and cured at 65° C. for one hour and for an additional two hours at 100° C. The resultant foams of rather high density were of varying physical properties. The formulation containing 12 grams of diisocyanate was hard at 100° C. and the 6-gram sample somewhat softer, and the 15-gram sample somewhat softer than the 6 at 100° C. All were self-extinguishing. At room temperature the formulation containing 15 grams of diisocyanate was slightly brittle, while the others were not. All the foams showed good adhesion to glass and metal.

To provide fire resistant properties, the finished foam should contain at least about 12% chlorine. The amount of diisocyanate which may be used in each instance to produce such fire and heat resistant properties may vary within the described permissible range, and it should be kept in mind that the alkyds containing smaller mole ratios of chlorendic components should contain correspondingly less diisocyanate to maintain optimum flame resistant properties. The use of a lower molecular weight aromatic diisocyanate such as toluene diisocyanate is preferred in that it provides a maximum number of functional groups with a minimum dilution of the total chlorine in the finished foam.

The alkyd resin should be fluid as previously described and the alkyd should be reacted until the acid value (or number) falls within the range of about 25 to 60 with about 45 being optimum.

Another advantage to the present foam-in-place resins is that they are prepared more rapidly and readily than the conventional flammable foams. This is true since the chlorendic alkyds mix more readily to a homogeneous mass, which facilitates industrial operations.

Thus, it is seen that the present flame resistant foams are readily prepared by ordinary processes and have unexpected fire resistance. In addition, the fire resistant foams of the present invention have low densities comparable with ordinary flammable foams. This is unusual since chlorendic resins themselves have a rather high density.

We claim:

1. A flame retardant, rigid, cellular plastic foam comprising from about 19 to about 38 weight percent of an aromatic diisocyanate reacted with from about 81 to about 62 weight percent of a fluid alkyd resin having an acid number between about 25 and about 60 and containing as constituent components between 14 mole percent and 22 mole percent chlorendic acid, an aliphatic dibasic acid containing from 5 to 10 carbon atoms inclusive, and a tri-hydric alcohol containing from 5 to 10 carbon atoms inclusive, said cellular plastic foam containing at least about 12 weight percent chlorine.

2. A flame retardant, rigid, cellular plastic foam comprising from about 19 to about 38 weight percent of an aromatic diisocyanate reacted with from about 81 to about 62 weight percent of a fluid alkyd resin having an acid number between about 25 and about 60 and containing as constituent components from 14 to 22 mole percent of chlorendic acid, from 20 to 29 mole percent of an aliphatic dibasic acid containing from 5 to 10 carbon atoms inclusive, and from 55 to 60 mole percent of a tri-hydric alcohol containing from 5 to 10 carbon atoms inclusive, said cellular plastic foam containing about 12 weight percent chlorine.

3. A flame retardant, rigid, cellular plastic foam comprising from about 19 to about 38 weight percent of toluene diisocyanate reacted with from about 81 to about 62 weight percent of a fluid alkyd resin having an acid number between about 25 and about 60 and containing as constituent components from 14 to 22 mole percent of chlorendic acid, from 20 to 29 mole percent of adipic acid, and from 55 to 60 mole percent of 1,2,6-hexanetriol, said cellular plastic foam containing at least about 12 weight percent chlorine.

4. A flame retardant, rigid, cellular plastic foam comprising from about 19 to about 38 weight percent of toluene diisocyanate reacted with from about 81 to 62 weight percent of a fluid alkyd resin having an acid number between about 25 and about 60 and containing as constituent components from 14 to 22 mole percent of chlorendic acid, from 20 to 29 mole percent of adipic acid, and from 55 to 60 mole percent of 1-(2-hydroxyethoxy)-2,4-dimethyl-2-hydroxymethyl-5-hydroxypentane, said cellular plastic foam containing at least about 12 weight percent chlorine.

5. A fire-resistant cellular reaction product which is produced by reacting a composition comprising (A) an alkyd resin comprised of the adduct of (1) hexachlorocyclopentadiene and maleic anhydride (2) an aliphatic dicarboxylic acid containing up to 10 carbon atoms and (3) hexantriol, (B) an aromatic diisocyanate and (C) water.

6. A fire-resistant cellular reaction product which is produced by reacting a composition comprising (A) an alkyd resin comprised of the adduct of (1) hexachlorocyclopentadiene and maleic anhydride (2) an aliphatic dicarboxylic acid containing from 5 to 10 carbon atoms and (3) hexantriol, and (B) an aromatic diisocyanate.

References Cited in the file of this patent

UNITED STATES PATENTS

| | | |
|---|---|---|
| 2,577,281 | Simon et al. | Dec. 4, 1951 |
| 2,606,910 | Herzfeld et al. | Aug. 12, 1952 |
| 2,783,215 | Robitschek et al. | Feb. 26, 1957 |